US012783768B2

(12) United States Patent
Tian et al.

(10) Patent No.: US 12,783,768 B2
(45) Date of Patent: Nov. 3, 2026

(54) FAULT DETECTION OF CIRCUIT BASED ON VIRTUAL DEFECTS

(71) Applicant: Taiwan Semiconductor Manufacturing Company Limited, Hsinchu (TW)

(72) Inventors: Yue Tian, Hsinchu (TW); Sandeep Kumar Goel, Dublin, CA (US)

(73) Assignee: Taiwan Semiconductor Manufacturing Company Limited, Hsinchu (TW)

(*) Notice: Subject to any disclaimer, the term of this patent is extended or adjusted under 35 U.S.C. 154(b) by 924 days.

(21) Appl. No.: 17/159,863

(22) Filed: Jan. 27, 2021

(65) Prior Publication Data

US 2022/0237353 A1 Jul. 28, 2022

(51) Int. Cl.

| | |
|---|---|
| ***G06F 30/3308*** | (2020.01) |
| ***G06F 30/343*** | (2020.01) |
| ***G06F 115/02*** | (2020.01) |
| ***G06F 119/18*** | (2020.01) |

(52) U.S. Cl.

CPC ........ *G06F 30/3308* (2020.01); *G06F 30/343* (2020.01); *G06F 2115/02* (2020.01); *G06F 2119/18* (2020.01)

(58) Field of Classification Search

CPC ............... G06F 30/3308; G06F 30/343; G06F 2115/02; G06F 2119/18; G06F 30/367

See application file for complete search history.

(56) References Cited

U.S. PATENT DOCUMENTS

| | | | | |
|---|---|---|---|---|
| 11,182,525 | B1 * | 11/2021 | Sokar | G06N 20/00 |
| 2002/0188904 | A1 * | 12/2002 | Chen | G01R 31/318342 714/741 |

(Continued)

FOREIGN PATENT DOCUMENTS

| | | | |
|---|---|---|---|
| CN | 101014955 | A | 8/2007 |
| CN | 110135088 | A | 8/2019 |

(Continued)

OTHER PUBLICATIONS

Office Action issued in connection with Chinese Appl. No. 202110765642.0 dated Jan. 26, 2025.

*Primary Examiner* — Renee D Chavez
*Assistant Examiner* — Pursottam Giri
(74) *Attorney, Agent, or Firm* — Foley & Lardner LLP

(57) ABSTRACT

Disclosed herein are related to a method, a device, and a non-transitory computer readable medium for testing a circuit model in an integrated circuit. In one aspect, to each of a plurality of sets of input conditions of a circuit model, a corresponding virtual defect is assigned. The virtual defect may be generated irrespective of a physical characteristic of an integrated circuit formed according to the circuit model. Each virtual defect may be associated with a corresponding set of input conditions. In one aspect, a table of the circuit model including a plurality of logic behavioral models of the circuit model is generated. Each of the plurality of logic behavioral models may include a corresponding set of the plurality of sets of input conditions, a corresponding output result, and the corresponding virtual defect. Based at least in part on the table of the circuit model, a test pattern for the circuit model can be generated.

20 Claims, 12 Drawing Sheets

(56) References Cited

U.S. PATENT DOCUMENTS

| | | | | |
|---|---|---|---|---|
| 2006/0053357 | A1* | 3/2006 | Rajski | G01R 31/31835 714/742 |
| 2006/0107157 | A1* | 5/2006 | Wen | G01R 31/31835 714/741 |
| 2007/0288822 | A1* | 12/2007 | Lin | G01R 31/318357 714/741 |
| 2010/0017668 | A1* | 1/2010 | Pichamuthu | G01R 31/318385 714/738 |
| 2016/0011257 | A1* | 1/2016 | Goel | G01R 31/318342 714/738 |
| 2018/0060472 | A1* | 3/2018 | Chen | G01R 31/318342 |
| 2021/0240905 | A1* | 8/2021 | Guo | G06F 30/398 |

FOREIGN PATENT DOCUMENTS

| | | | |
|---|---|---|---|
| TW | 201643450 | A | 12/2016 |
| TW | 202013222 | A | 4/2020 |
| TW | 202026877 | A | 7/2020 |
| TW | 202038092 | A | 10/2020 |

* cited by examiner

410

| Rows | Input conditions | | Output | D1 | D2 | D3 | D4 | Unmodeled defect |
|---|---|---|---|---|---|---|---|---|
| | A | B | | | | | | |
| 0 | 0 | 0 | 0 | 1 | 0 | 0 | 0 | 0 |
| 1 | 0 | 1 | 0 | 0 | 1 | 0 | 0 | 0 |
| 2 | 1 | 0 | 0 | 0 | 0 | 1 | 0 | 0 |
| 3 | 1 | 1 | 1 | 0 | 0 | 0 | 1 | 1 |

510

| Rows | Input conditions | | Output | Virtual Defect | | | | | | | | | | | |
|---|---|---|---|---|---|---|---|---|---|---|---|---|---|---|---|
| | A | B | | D1 | D2 | D3 | D4 | D5 | D6 | D7 | D8 | D9 | D10 | D11 | D12 |
| 0 | R | 0 | 0 | 1 | 0 | 0 | 0 | 0 | 0 | 0 | 0 | 0 | 0 | 0 | 0 |
| 1 | 0 | R | 0 | 0 | 1 | 0 | 0 | 0 | 0 | 0 | 0 | 0 | 0 | 0 | 0 |
| 2 | R | 1 | R | 0 | 0 | 1 | 0 | 0 | 0 | 0 | 0 | 0 | 0 | 0 | 0 |
| 3 | 0 | F | 0 | 0 | 0 | 0 | 1 | 0 | 0 | 0 | 0 | 0 | 0 | 0 | 0 |
| 4 | F | 0 | 0 | 0 | 0 | 0 | 0 | 1 | 0 | 0 | 0 | 0 | 0 | 0 | 0 |
| 5 | 1 | R | R | 0 | 0 | 0 | 0 | 0 | 1 | 0 | 0 | 0 | 0 | 0 | 0 |
| 6 | F | 1 | F | 0 | 0 | 0 | 0 | 0 | 0 | 1 | 0 | 0 | 0 | 0 | 0 |
| 7 | 1 | F | F | 0 | 0 | 0 | 0 | 0 | 0 | 0 | 1 | 0 | 0 | 0 | 0 |
| 8 | R | R | R | 0 | 0 | 0 | 0 | 0 | 0 | 0 | 0 | 1 | 0 | 0 | 0 |
| 9 | R | F | 0 | 0 | 0 | 0 | 0 | 0 | 0 | 0 | 0 | 0 | 1 | 0 | 0 |
| 10 | F | R | 0 | 0 | 0 | 0 | 0 | 0 | 0 | 0 | 0 | 0 | 0 | 1 | 0 |
| 11 | F | F | F | 0 | 0 | 0 | 0 | 0 | 0 | 0 | 0 | 0 | 0 | 0 | 1 |

FIG. 5

600

| Rows | Input conditions | Instance 1 | 2 | 3 | 4 |
|---|---|---|---|---|---|
| 0 | 000 | Detected | Undetected | Undetected | Undetected |
| 1 | 001 | Undetected | Undetected | Undetected | Detected |
| 2 | 010 | Undetected | Undetected | Detected | Detected |
| 3 | 011 | Undetected | Undetected | Detected | Detected |
| 4 | 100 | Undetected | Undetected | Detected | Detected |
| 5 | 101 | Undetected | Undetected | Undetected | Detected |
| 6 | 110 | Undetected | Undetected | Undetected | Undetected |
| 7 | 111 | Undetected | Undetected | Undetected | Undetected |

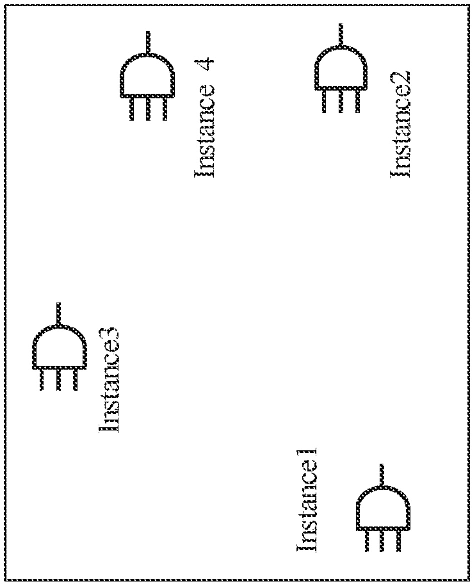

FIG. 6A

650

| Rows | Input conditions | | | Output | Virtual Defect | | | | | | | |
|---|---|---|---|---|---|---|---|---|---|---|---|---|
| | A | B | C | | D1 | D2 | D3 | D4 | D5 | D6 | D7 | D8 |
| 6 | 1 | 1 | 0 | 0 | 0 | 0 | 0 | 0 | 0 | 0 | 1 | 0 |
| 7 | 1 | 1 | 1 | 1 | 0 | 0 | 0 | 0 | 0 | 0 | 0 | 1 |

FIG. 6B

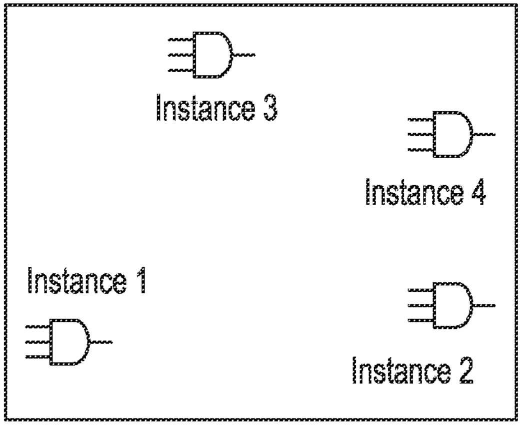

700

| | | Instance | | | |
|---|---|---|---|---|---|
| Rows | Input conditions | 1 | 2 | 3 | 4 |
| 0 | 000 | Detected | Undetected | Undetected | Undetected |
| 1 | 001 | Detected | Detected | Detected | Detected |
| 2 | 010 | Detected | Detected | Detected | Detected |
| 3 | 011 | Detected | Detected | Detected | Detected |
| 4 | 100 | Detected | Detected | Detected | Detected |
| 5 | 101 | Undetected | Undetected | Undetected | Detected |
| 6 | 110 | Undetected | Undetected | Undetected | Undetected |
| 7 | 111 | Undetected | Undetected | Undetected | Undetected |

FIG. 7A

750

| Rows | Input conditions | | | Output | Virtual Defect | | | | | | | |
|---|---|---|---|---|---|---|---|---|---|---|---|---|
| | A | B | C | | D1 | D2 | D3 | D4 | D5 | D6 | D7 | D8 |
| 0 | 0 | 0 | 0 | 0 | 1 | 0 | 0 | 0 | 0 | 0 | 0 | 0 |
| 5 | 1 | 0 | 1 | 1 | 0 | 0 | 0 | 0 | 0 | 1 | 0 | 0 |
| 6 | 1 | 1 | 0 | 0 | 0 | 0 | 0 | 0 | 0 | 0 | 1 | 0 |
| 7 | 1 | 1 | 1 | 1 | 0 | 0 | 0 | 0 | 0 | 0 | 0 | 1 |

FIG. 7B

FAULT DETECTION OF CIRCUIT BASED ON VIRTUAL DEFECTS

BACKGROUND

Developments in integrated circuit design allow a large number of circuit components to be integrated in a small form factor and to perform various logic computations. Often, some circuit components of the integrated circuit may have defects, causing the circuit components to render incorrect logic computations. For example, a parasitic resistance or a parasitic capacitance in a circuit component can cause an unintended electrical signal (e.g., a voltage or a current) to be provided. For another example, an unintended disconnection between two or more circuit components may prevent an electrical signal (e.g., a voltage or a current) from being provided. Such unintentionally provided or unintentionally prevented electrical signals due to various defects in the circuit components can cause incorrect logic computations.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5 is an example table of logic behavioral models of a dynamic logic circuit model with virtual defects, in accordance with one embodiment.

FIG. 6A is an example result of fault detection simulation performed on multiple instances of a circuit model, in accordance with one embodiment.

FIG. 6B is an example reduced table of logic behavioral models based on the result of fault simulation in FIG. 6A, in accordance with one embodiment.

FIG. 7A is another example result of fault detection simulation performed on multiple instances of a circuit model, in accordance with one embodiment.

FIG. 7B is another example reduced table of logic behavioral models based on the result of fault simulation in FIG. 7A, in accordance with one embodiment.

DETAILED DESCRIPTION

Figure 1:
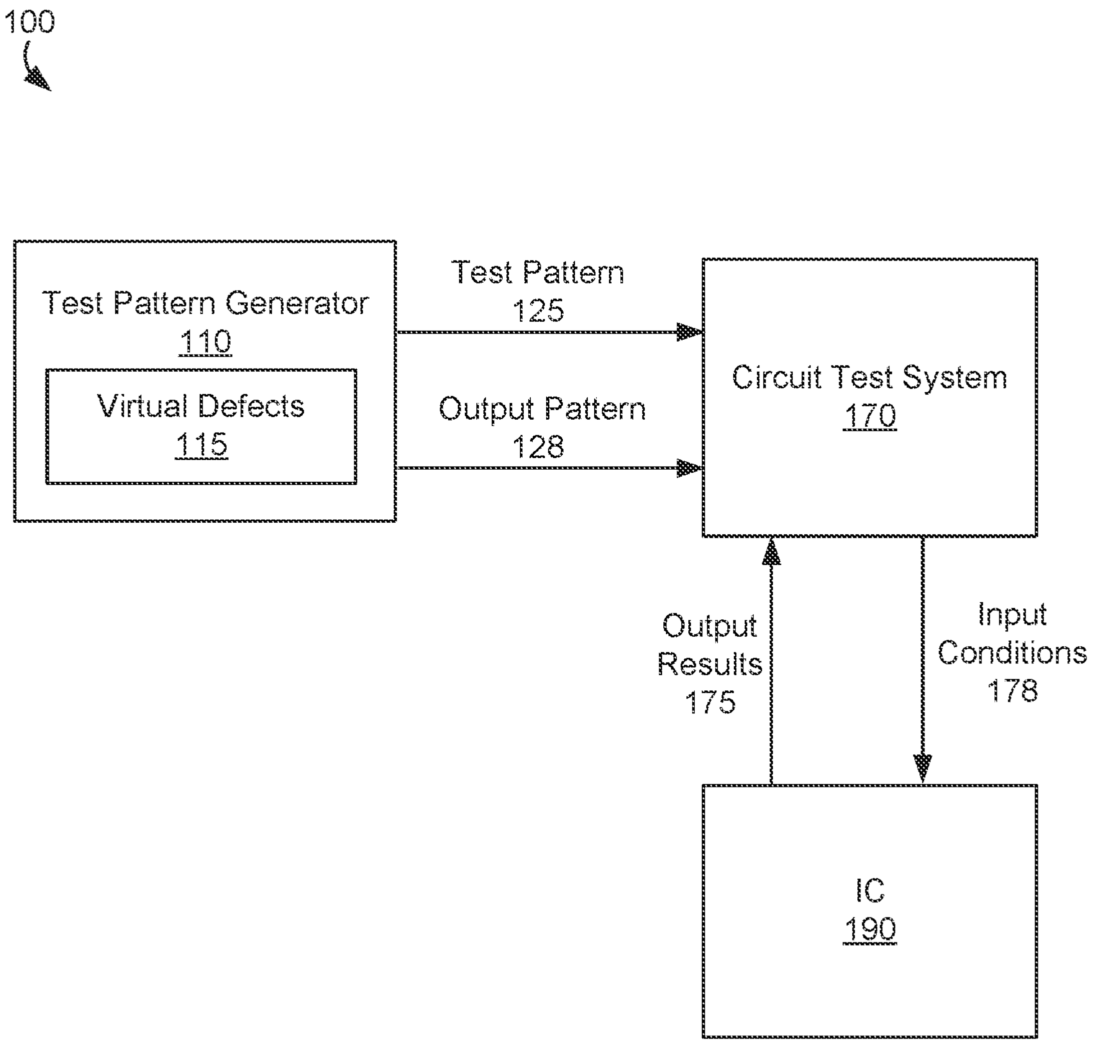
FIG. 1 is a diagram of a system for detecting defects in an integrated circuit based on virtual defects associated with the integrated circuit, in accordance with one embodiment.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Disclosed herein are related to a method, a device, and a non-transitory computer readable medium for testing an integrated circuit. In one aspect, to each of a plurality of sets of input conditions of a circuit model, a single corresponding virtual defect is assigned. In one aspect, each virtual defect is generated irrespective of physical characteristics of an integrated circuit formed according to the circuit model. Each virtual defect may be associated with a corresponding set of input conditions. In one aspect, a table including a plurality of logic behavioral models of the circuit model is generated. Each of the plurality of logic behavioral models may include or indicate a corresponding set of the plurality of sets of input conditions, a corresponding output result, and the corresponding virtual defect. Based at least in part on the table of the circuit model, a test pattern for the circuit model can be generated.

Advantageously, generating a test pattern according to virtual defects disclosed herein allows detecting incorrect computations by a circuit component despite of unmodeled defects. In one implementation, a test pattern is generated by modeling one or more defects based on physical characteristics (e.g., resistance, capacitance, etc.) of a circuit component. For example, defects such as parasitic resistances, parasitic capacitances, and/or disconnections between two or more components can be modeled to predict or simulate effects of those defects on logic computations. In one implementation, one or more sets of input conditions allowing detection of the modeled defects can be determined, and a test pattern can be generated according to the one or more sets of input conditions. However, such test pattern generated based on the modeled defects may be unable to detect unmodeled defects of the circuit component. In some embodiments, possible sets of input conditions of a circuit component are determined, and each set of input conditions is assigned to a unique virtual defect irrespective of any physical defect of the circuit component. Moreover, one or more test patterns can be generated based on different sets of input conditions with virtual defects. One or more test patterns generated based on different sets of inputs conditions with virtual defects may allow detecting unmodeled defects.

Advantageously, the virtual defects allow a test pattern to be generated in an efficient manner. In one aspect, generating a test pattern according to modeled defects based on physical characteristics of circuit components may be computationally exhaustive. For example, a model of a physical defect can be generated, and the effects of the modeled defect can be predicted through a Simulation Program with Integrated Circuit Emphasis (SPICE) simulation. However, performing such simulation may take a long time (e.g., a few hours to a few days). By assigning, to each of a corresponding set of input conditions, a unique virtual defect irrespective of physical characteristics of a circuit model, and generating a test pattern according to different sets of input conditions and corresponding virtual defects, cost inefficient simulations (e.g., SPICE simulation) to predict effects of physical defects can be obviated. Hence, the test pattern can be generated in a computationally efficient manner by omitting such cost inefficient simulations.

In one aspect, the disclosed method, device, and non-transitory computer readable medium can generate additional test patterns that can compensate for or supplement deficiencies of one or more test patterns (e.g., existing test patterns). In one aspect, a table of a circuit model including a plurality of logic behavioral models of the circuit model is generated. Each of the plurality of logic behavioral models may include a corresponding set of input conditions, a corresponding output result, and a corresponding virtual defect. In one aspect, a fault detection simulation of the circuit model is performed, according to one or more test patterns associated with the circuit model. The one or more test patterns may be existing test patterns of a circuit model generated. In one example, a plurality of instances of the circuit model can be simulated according to the one or more test patterns associated with the circuit model. Based on the simulation, one or more instances rendered fault results in response to a set of input conditions of a logic behavioral model from the table can be detected. Such set of input conditions that rendered the fault results can be determined to be tested input conditions. Then, from the plurality of logic behavioral models in the table, the logic behavioral model with the set of input conditions (or the tested input conditions) can be excluded to generate the reduced table. Moreover, an additional test pattern can be generated according to the reduced table including remaining logic behavioral models. Accordingly, one or more additional test patterns capable of testing defects that are not detectable by the one or more test patterns (e.g., existing test patterns) can be generated. Hence, a circuit model can be tested according to the one or more test patterns (e.g., existing test patterns) and the additional test pattern. In one aspect, the one or more test patterns (e.g., existing test patterns) can be used (or reused) to improve efficiency, where the additional test pattern can be used to supplement deficiency of the one or more test patterns (e.g., existing test patterns).

FIG. 1 is a diagram of a system 100 for detecting defects in an integrated circuit (IC) 190 based on virtual defects 115 associated the integrated circuit, in accordance with one embodiment. In some embodiments, the system 100 includes test pattern generator 110, a circuit test system 170 and the IC 190. In one configuration, the test pattern generator 110 generates a test pattern 125 for testing functionalities of the IC 190 and provides the test pattern 125 to the circuit test system 170. In one configuration, the circuit test system 170 receives the test pattern 125 from the test pattern generator 110 and generates input conditions 178 according to the test pattern 125. The circuit test system 170 may apply the input conditions 178 to the IC 190, and receives output results 175. Based on the output results 175, the circuit test system 170 can determine whether the IC 190 is operating as designed. In other embodiments, the system 100 includes more, fewer, or different components than shown in FIG. 1. In some embodiments, the test pattern generator 110 and the circuit test system 170 are integrated as a single computing device.

In some embodiments, the test pattern generator 110 is a component that generates the test pattern 125 indicating a vector or a sequence of different sets of input conditions 178 to test functionalities of the IC 190. The test pattern generator 110 may be embodied as a computing system (e.g., 1000 of FIG. 10). In other embodiments, the test pattern generator 110 can be replaced by other components that perform the functionality of the test pattern generator 110. In one aspect, the test pattern generator 110 generates the test pattern 125, according to virtual defects 115 associated with the IC 190, as described below with respect to FIGS. 2-9. In one aspect, each virtual defect 115 is generated irrespective of physical characteristics of the IC 190 and is associated with a single corresponding set of input conditions 178 to the IC 190. Advantageously, the test pattern 125 generated based on the virtual defects 115 allows detecting defects that may not be anticipated or modeled based on physical characteristics of the IC 190. The test pattern generator 110 may also generate an output pattern 128 indicating a vector or a sequence of expected output results associated with different sets of input conditions 178 indicated by the test pattern 125 and provide the output pattern 128 to the circuit test system 170.

In one aspect, the circuit test system 170 is a component that receives the test pattern 125 and the output pattern 128 and tests the IC 190 according to the test pattern 125. The circuit test system 170 may be embodied as a computing system. In other embodiments, the circuit test system 170 can be replaced by other components that perform the functionality of the circuit test system 170. In one aspect, the circuit test system 170 generates a vector or a sequence of multiple sets of input conditions 178 (e.g., voltage or current) according to the test pattern 125 and applies the vector or the sequence of multiple sets of input conditions 178 to the IC 190. In response to the vector or the sequence of multiple sets of input conditions 178 applied to the IC 190, the circuit test system 170 may receive a vector or a sequence of output results 175. The circuit test system 170 may compare the received vector or the sequence of output results 175 with the vector or the sequence of expected output results indicated by the output pattern 128. Based on the comparison, the circuit test system 170 may determine whether the IC 190 is operating correctly or not. For example, in response to the received vector or the sequence of output results 175 matching the vector or the sequence of expected output results indicated by the output pattern 128, the circuit test system 170 may determine that no fault is detected. For example, in response to the received vector or the sequence of output results 175 not matching the vector or the sequence of expected output results indicated by the output pattern 128, the circuit test system 170 may determine that one or more faults are detected.

Figure 2:
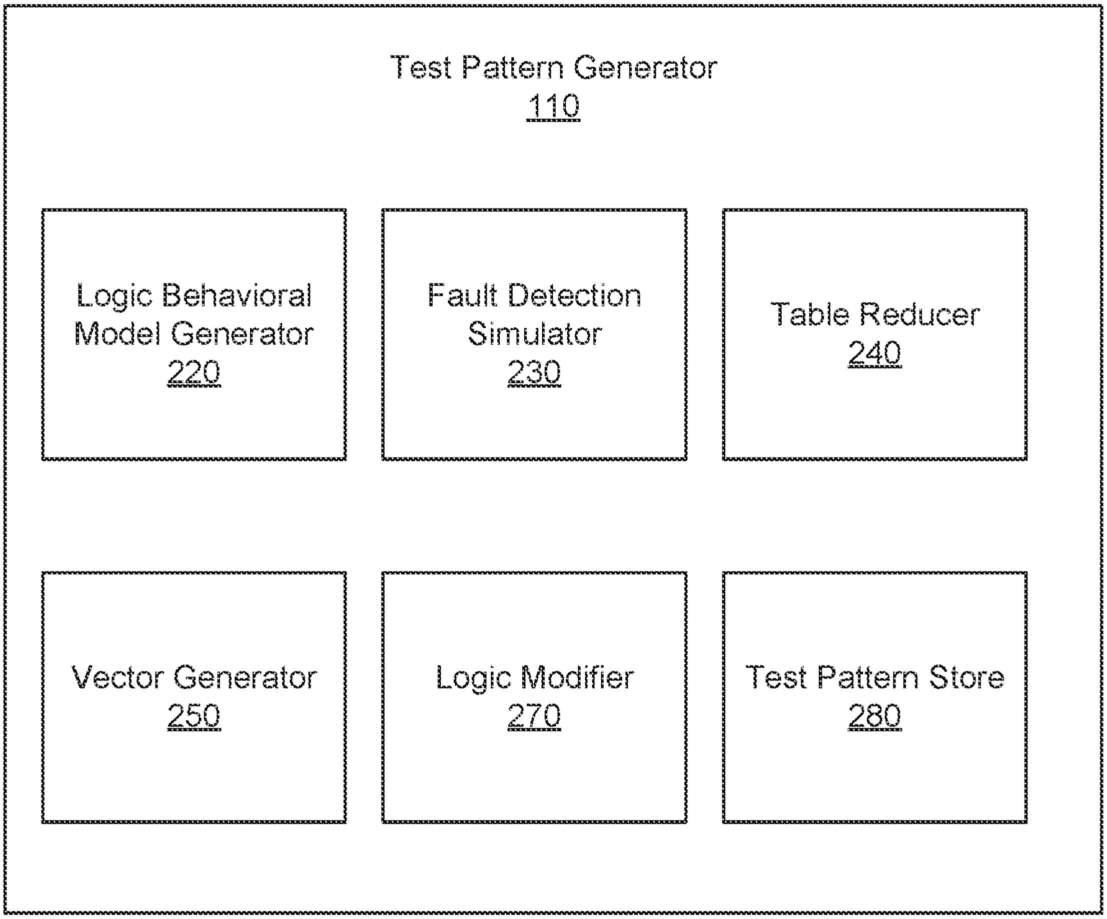
FIG. 2 is a diagram of a test pattern generator, in accordance with one embodiment.

FIG. 2 is a diagram of a test pattern generator 110, in accordance with one embodiment. In some embodiments, the test pattern generator 110 includes a logic behavioral model generator 220, a fault detection simulator 230, a table reducer 240, a vector generator 250, a logic modifier 270, and a test pattern store 280. These components may operate together to assign virtual defects 115 to each logic behavioral model of a circuit model and generate a test pattern according to the logic behavioral models. A virtual defect 115 may be an arbitrarily generated defect assigned to or corresponding to a unique set of input conditions irrespective of physical characteristics of an integrated circuit. In one aspect, each virtual defect 115 functions as an identification of a corresponding set of input conditions. By employing a virtual defect 115 and testing additional sets of input conditions, incorrect operations of the IC 190 due to unmodeled defects that may not be detected by an existing or a pre-generated test pattern can be detected. In some embodiments, these components can be embodied as hardware, software, or a combination of hardware and software. In some embodiments, the test pattern generator 110 includes more, fewer, or different components than shown in FIG. 2.

In some embodiments, the logic behavioral model generator 220 is a component that generates behavioral models of a circuit model based on virtual defects. In other embodiments, the logic behavioral model generator 220 can be replaced by other components that perform the functionality of the logic behavioral model generator 220. In one aspect, a circuit model electrically models a circuit. For example, a circuit model can electrically model a NAND gate, AND gate, OR gate, XOR gate, XNOR gate, a multiplexer, a latch, a flip flop, or any circuit. In one aspect, a behavioral model indicates different sets of inputs conditions applied to the circuit model, corresponding output results and corresponding virtual defects. In one aspect, each virtual defect 115 is generated irrespective of physical characteristics of a circuit formed according to the circuit model. In some embodiments, the logic behavioral model generator 220 determines possible sets of input conditions of the circuit model. For each set of input conditions, the logic behavioral model generator 220 may determine a corresponding output result expected and a corresponding virtual defect 115. The logic behavior model generator 220 may generate a table including behavioral models. Assuming for an example that an integrated circuit has two inputs with four possible sets of input conditions [00], [01], [10], [11], the logic behavior model generator 220 may assign a virtual defect D1 to a first set of input conditions (e.g., [00]), a virtual defect D2 to a second set of input conditions (e.g., [01]), a virtual defect D3 to a third set of input conditions (e.g., [10]), and a virtual defect D4 to a fourth set of input conditions (e.g., [11]).

In some embodiments, the fault detection simulator 230 is a component that performs a fault detection simulation on a circuit model. In other embodiments, the fault detection simulator 230 can be replaced by other components that perform the functionality of the fault detection simulator 230. In one approach, the fault detection simulator 230 obtains one or more test patterns from the test pattern store 280. A test pattern may indicate a vector or a sequence of different sets of input conditions. Some test patterns stored by the test pattern store 280 may be generated according to the logic behavioral models generated by the logic behavioral model generator 220. Some test patterns stored by the test pattern store 280 may be predetermined or generated through other components. In one approach, the fault detection simulator 230 simulates a circuit model according to the test pattern and determines whether faults can be detected or not. For example, if the simulation output is different from a vector of expected output corresponding to the vector of different sets of input conditions, the fault detection simulator 230 may determine that a fault is detected. For example, if the simulation output matches the vector of expected output, the fault detection simulator 230 may determine that a fault is not detected.

In some embodiments, the table reducer 240 is a component that reduces the table from the logic behavioral model generator 220 according to the fault detection simulation. In other embodiments, the table reducer 240 can be replaced by other components that perform the functionality of the table reducer 240. In some embodiments, the table reducer 240 configures or causes the fault detection simulator 230 to perform a fault detection simulation on a plurality of instances of a circuit model with an existing test pattern, and reduces the table of the circuit model from the logic behavioral model generator 220 according to the fault detection simulation. In one approach, the table reducer 240 detects an instance of the plurality of instances of the circuit model simulated with a set of input conditions of a logic behavioral model from the table and rendered a fault result different from the corresponding output result. Then, the table reducer 240 may exclude, from the plurality of logic behavioral models in the table, the logic behavioral model applied to the instance and rendered the fault result. In one approach, the table reducer 240 detects each of a plurality of instances simulated with a set of input conditions of a logic behavioral model from the table and rendered a fault result different from the corresponding output result. Then, the table reducer 240 may exclude, from the plurality of logic behavioral models in the table, the logic behavioral model applied to the plurality of instances of the circuit model and rendered the fault result.

In some embodiments, the vector generator 250 is a component that generates a test pattern according to the reduced table from the table reducer 240. In other embodiments, the vector generator 250 can be replaced by other components that perform the functionality of the vector generator 250. In some embodiments, the vector generator 250 generates a vector or a sequence of a set of input conditions of a circuit model, according to different sets of input conditions in logic behavioral models of the circuit model in the reduced table. Assuming for an example that the reduced table includes a first set of input conditions [01] for two inputs of a NAND gate and a second set of input conditions [11] for the two inputs of the NAND gate, the vector generator 250 may generate a vector or sequence of sets of input conditions [01], [11] for the two inputs of the NAND gate. The vector generator 250 may store the test pattern in the test pattern store 280.

Advantageously, an additional test pattern allowing unmodeled defects that cannot be detected according to one or more existing test patterns can be generated in an efficient manner. For example, one or more existing test patterns are generated to detect one or more physical defects of a circuit model but may not be able to detect an unmodeled defect. In one aspect, the fault detection simulator 230 performs a fault detection simulation of the circuit model according to the one or more existing test patterns and determines one or more sets of input conditions or logic behavioral models allowing detection of one or more defects of the circuit model. Then, the table reducer 240 may generate a reduced table by excluding the one or more logic behavioral models. The vector generator 250 may generate an additional test pattern according to one or more sets of input conditions or logic behavioral models in the reduced table. Accordingly, an additional test pattern that can compensate for the deficiencies of one or more existing test patterns can be generated.

In some embodiments, the logic modifier 270 is a component that generates modifies a circuit design, according to fault detection simulations. In other embodiments, the logic modifier 270 can be replaced by other components that perform the functionality of the logic modifier 270. In some embodiments, the logic modifier 270 configures the fault detection simulator 230 to perform a fault detection simulation on a plurality of instances of a circuit model with the additional test pattern generated by the vector generator 250, and detects one or more sets of input conditions in the reduced table unable to detect any fault. If a fault detection based on the additional test pattern is unable to detect a fault, for one or more of the sets of input conditions in the reduced table, the logic modifier 270 may modify the circuit model. For example, the logic modifier 270 may add a logic circuit model (e.g., sequential logic circuit model and/or control logic circuit model) at an input port of the circuit model to adaptively configure an input condition at the input port. By adaptively configuring the input condition at the input port, incorrect circuit operations due to one or more faults incapable of being detected by the original circuit model can be detected. If a fault detection based on the additional test pattern can detect, for each of the sets of input conditions in the reduced table, at least a corresponding fault, then the logic modifier 270 may validate the additional test pattern without modifying the circuit model.

Figure 3A:
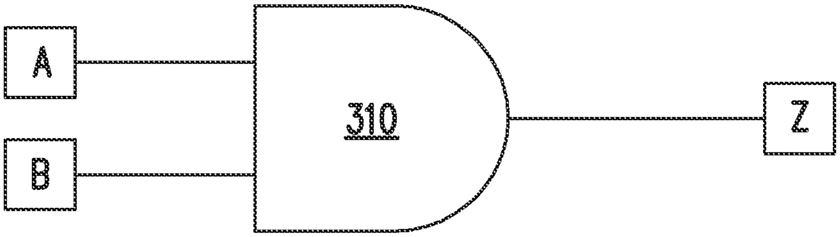
FIG. 3A is an example diagram of a circuit model, in accordance with one embodiment.
Figure 3B:
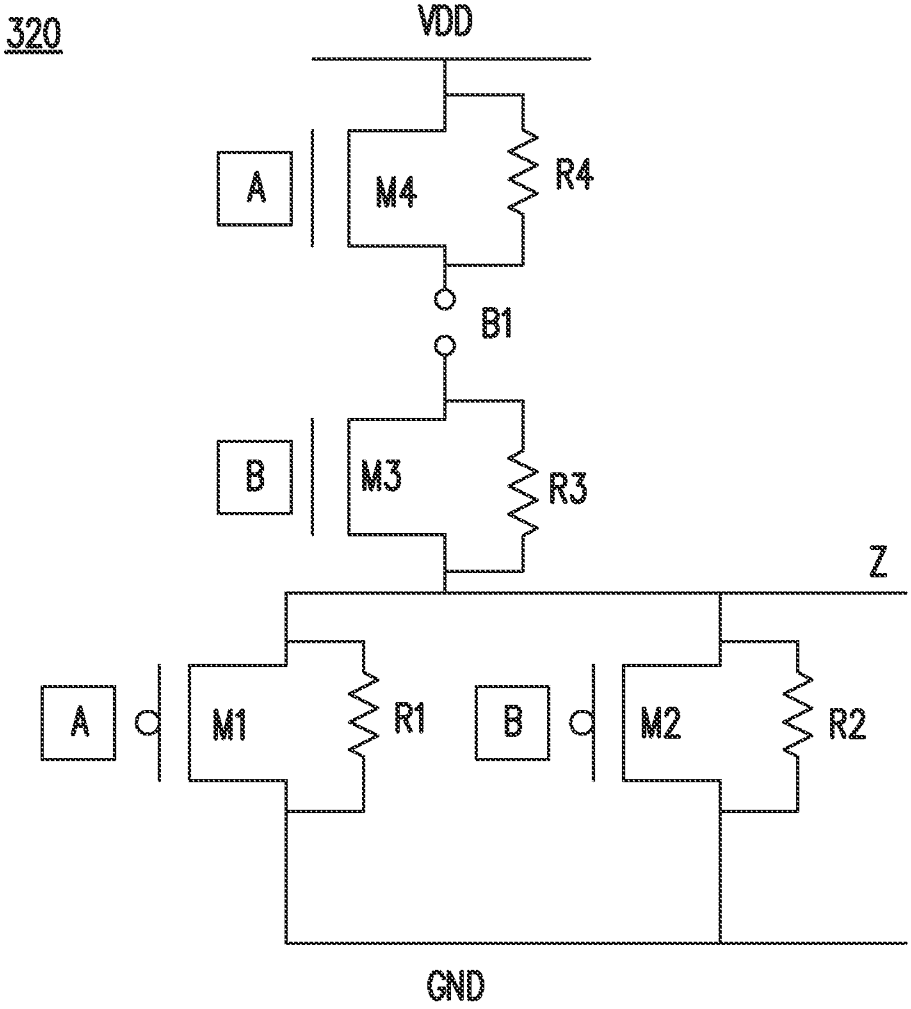
FIG. 3B is an example schematic diagram of the circuit model of FIG. 3A, in accordance with one embodiment.

FIG. 3A is an example diagram of a circuit model 310, in accordance with one embodiment, and FIG. 3B is an example schematic diagram 320 of the circuit model 310 of FIG. 3A, in accordance with one embodiment. In one aspect, the circuit model 310 is a computer-generated model electrically representing an AND gate with input ports A, B and an output port Z. In one configuration, the AND gate can be implemented as P-type transistors M1, M2 (e.g., P-channel field effect transistors), and N-type transistors M3, M4 (e.g., N-channel field effect transistors). In one configuration, the P-type transistors M1, M2 are connected in parallel with each other between a ground rail for supplying a ground voltage GND and the output port Z, and the N-type transistors M3, M4 are connected to each other in series between a supply rail for supplying a supply voltage VDD and the output port Z. In one configuration, the input port A is coupled to a gate electrode of the transistors M1, M4, and the input port B is coupled to a gate electrode of the transistors M2, M3. In this configuration, the transistors M1-M4 can perform an AND logic operation according to input conditions received by the input ports A, B, and output the result of the AND logic operation at the output port Z.

In some embodiments, the AND gate implemented according to the circuit model 310 can have various defects. For example, the AND gate may have parasitic resistances R1-R4, and a disconnection B1. In one approach, some of the defects of the AND gate can be modeled, and a test pattern to detect the modeled defects can be generated. For example, a test pattern with input conditions [00] applied to the input ports A, B of the AND gate 310 may be used to detect any physical defects R1-R4, and/or the disconnection B1. However, such test pattern generated according to the modeled defects based on physical characteristics of the AND gate may be unable to detect unmodeled defects. In some embodiments, by assigning virtual defects to different sets of input conditions of a circuit model and generating a test pattern according to the virtual defects as disclosed herein, a new or an updated test pattern can be generated to test the integrated circuit with input conditions that are not covered by a pre-generated or an existing test pattern. Accordingly, incorrect circuit operations due to defects that may not be modeled can be detected by applying the new or updated test pattern to the integrated circuit.

Figure 4:
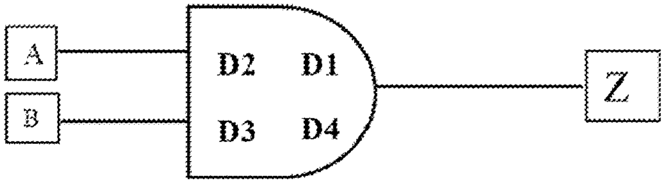
FIG. 4 is an example table of logic behavioral models of a circuit model with virtual defects, in accordance with one embodiment.

FIG. 4 is an example table 410 of logic behavioral models with virtual defects, in accordance with one embodiment. The logic behavioral model generator 220 may determine all possible sets of input conditions of an integrated circuit, and generate a table including, for each set of input conditions, a corresponding output result. For each set of input conditions, the logic behavioral model generator 220 may generate and assign a unique virtual defect to identify said each set of input conditions. In the example shown in FIG. 4, the logic behavioral model generator 220 may generate the table 410 including different sets of input conditions at input ports A, B, where each set of input conditions is associated with a corresponding output result and a corresponding virtual defect D. A virtual defect D may be an arbitrarily generated defect assigned to or corresponding to a unique set of input conditions irrespective of physical characteristics of an integrated circuit. In one aspect, each virtual defect D functions as an identification of a corresponding set of input conditions. For example, a set of input conditions [00] is associated with an output result [0] and a virtual defect D1; a set of input conditions [01] is associated with an output result [0] and a virtual defect D2; a set of input conditions [10] is associated with an output result [0] and a virtual defect D3; and a set of input conditions [11] is associated with an output result [1] and a virtual defect D4. In one aspect, each set of input conditions is associated with a unique virtual defect. By assigning a virtual defect to each set of input conditions irrespective of physical characteristics of a circuit and generating a test pattern according to different input conditions assigned with different virtual defects, a new or an updated test pattern can be generated to test the integrated circuit with input conditions that are not covered by a pre-generated or an existing test pattern. Accordingly, incorrect circuit operations due to unmodeled defects can be detected according to the test pattern based on virtual defects.

FIG. 5 is an example table 510 of logic behavioral models of a dynamic logic circuit model with virtual defects, in accordance with one embodiment. In one aspect, the table 510 is similar to the table 410 of FIG. 4, except the table 510 includes logic behavioral models with input conditions having dynamic states. For example, the table 510 includes a state [R] corresponding to a rising edge of an input signal and a state [F] corresponding to a falling edge of an input signal. In one aspect, the logic behavioral model generator 220 may generate the table 510 including different sets of input conditions having different dynamic states at input ports A, B, where each set of input conditions associated with a corresponding virtual defect. Accordingly, the table may include behavioral models for varying sets of input conditions including a static state (e.g., [0] or [1]), a dynamic state (e.g., [R] or [F]), any different logic state, or any combination of them. By assigning virtual defects to different sets of input conditions of a circuit model and generating a test pattern according to the virtual defects as disclosed herein, a new or an updated test pattern can be generated to test the integrated circuit with input conditions that are not covered by a pre-generated or an existing test pattern. Accordingly, incorrect circuit operations due to defects that may be difficult to model or predict can be detected by generating a test pattern according to the table 510.

FIG. 6A is an example result 600 of fault detection simulation performed on a circuit model, in accordance with one embodiment. FIG. 6B is an example reduced table 650 of logic behavioral models based on the result 600 of fault detection simulation in FIG. 6A, in accordance with one embodiment. In one approach, the table reducer 240 generates, from a table of logic behavioral models, the reduced table 650 including one or more sets of input conditions unable to detect any fault by any instance based on one or more predetermined or existing test patterns. In one example, the test pattern generator 110 determines whether untested behavioral model in the table exists or not. The test pattern generator 110 may determine that one or more behavioral models with sets of input conditions that caused one or more instances that rendered the fault simulation result to be a tested behavioral model. The test pattern generator 110 may determine that one or more behavioral models with sets of input conditions unable to detect any fault as an untested behavioral model. In one approach, the test pattern generator 110 may exclude, from the plurality of logic behavioral models in the table, the tested logic behavioral models (or logic behavioral models applied to one or more instances and rendered fault results). According to the one or more sets of input conditions in the reduced table 650, the vector generator 250 may generate an additional test pattern, which may allow detecting incorrect circuit operations due to one or more faults not detectable by a pre-generated or existing test pattern.

In one example, an IC design includes instances 1-4 of a three input AND gate model. In one approach, a fault detection simulation is performed according to a test pattern (e.g., pre-generated or existing test pattern). In one approach, the fault detection simulator 230 simulates the IC design according to the test pattern. In addition, the fault detection simulator 230 obtains a table of eight behavioral models, for example, from the logic behavioral model generator 220. For each set of input conditions of a corresponding behavioral model in the table, the fault detection simulator 230 may determine whether any fault can be detected by any instance of the AND gate model. For example, if the simulation output is different from a vector of expected output corresponding to the vector of different sets of input conditions, the test pattern generator 110 may determine that a fault is detected. For example, if the simulation output matches the vector of expected output, the test pattern generator 110 may determine that a fault is not detected. In the example shown in FIG. 6A, for a set of input conditions [000], a fault is detected by the instance 1, and for a set of input conditions [001], a fault is detected by the instance 4. For sets of input conditions [010], [011], [100], faults are detected by the instances 3 and 4. For a set of input conditions [101], a fault is detected by the instance 4. Moreover, no fault is detected for sets of input conditions [110] and [111]. Hence, the fault detection simulator 230 can detect one or more sets of input conditions (e.g., [110] and [111]) unable to detect any fault according to pre-generated or existing test patterns. According to the result 600 of the fault detection simulation shown in FIG. 6A, the table reducer 240 generates the reduced table 650 including behavioral models associated with the sets of input conditions [110] and [111] unable to detect any fault according to pre-generated or existing test patterns. In one approach, the table reducer 240 may remove or exclude behavioral models associated with the sets of input conditions [000], [001], [010], [011], [100], [101] that are able to detect any fault according to pre-generated or existing test patterns from the table 600. Moreover, the vector generator 250 may generate an additional test pattern according to the sets of input conditions [110] and [111] in the reduced table 650, which may allow detecting one or more faults not detectable by a pre-generated or existing test pattern.

FIG. 7A is an example result 700 of fault detection simulation performed on a circuit model, in accordance with one embodiment. FIG. 7B is an example reduced table 750 of logic behavioral models of the circuit model with virtual defects, in accordance with one embodiment. The result 700 is similar to the result 600 of FIG. 6A, except that for each of the sets of input conditions [010], [011], [100], [101], faults are detected by fault simulations on the instances 1-4. Unlike the example shown in FIG. 6A, the fault detection simulator 230 can detect one or more sets of input conditions (e.g., [000], [101], [110], and [111]) unable to detect any fault by each of the instances 1-4 according to pre-generated or existing test patterns. The table reducer 240 may generate, from a table of logic behavioral models, the reduced table 750 including one or more sets of input conditions (e.g., [000], [101], [110], and [111]) unable to detect all faults by each of the instances 1-4 based on one or more predetermined or existing test patterns. According to the one or more sets of input conditions in the reduced table 750, the vector generator 250 may generate one or more additional test patterns, which may allow detecting incorrect circuit operations due to one or more faults not detectable by a pre-generated or existing test pattern. By generating the reduced table 750 according to one or more sets of input conditions (e.g., [000], [101], [110], and [111]) that are unable to detect all faults by each of the instances 1-4 according to pre-generated or existing test patterns, an additional test pattern that allows detecting one or more faults by the instances 1-4 consistently can be generated.

Figure 8A:
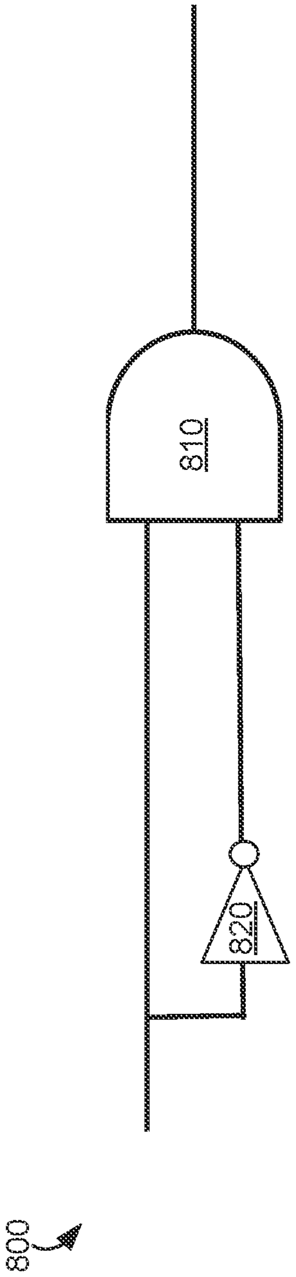
FIG. 8A is an example circuit model, in accordance with one embodiment.
Figure 8B:
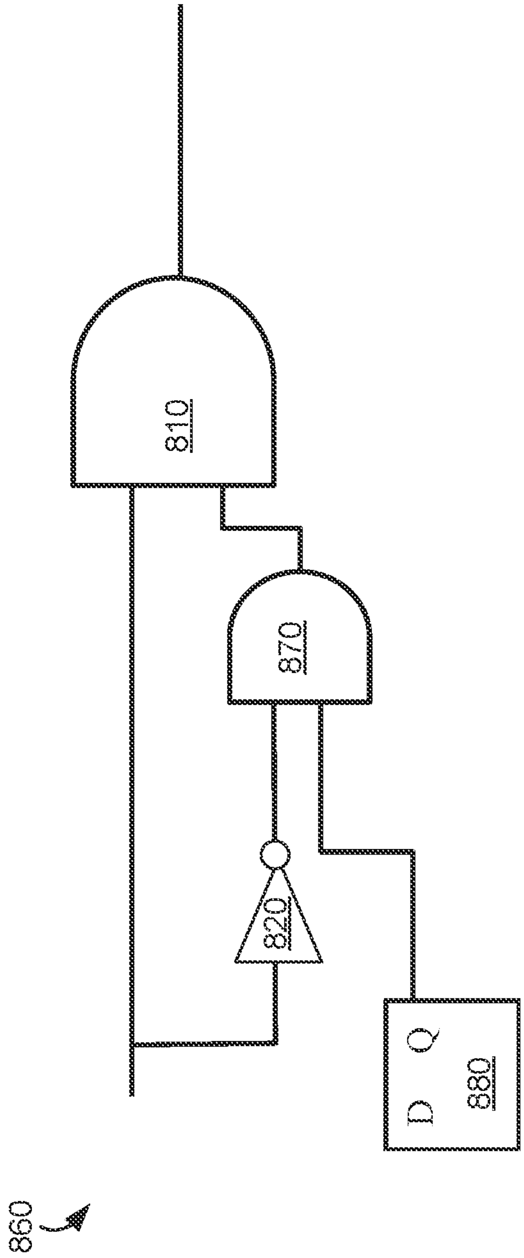
FIG. 8B is an example modified circuit model, in accordance with one embodiment.

FIG. 8A is an example circuit model 800, in accordance with one embodiment. FIG. 8B is an example modified circuit model 860, in accordance with one embodiment. A circuit designer may generate a model of any logic circuit that predicts logic behaviors of the logic circuit in response to different sets of input conditions. Assuming for an example that the circuit model 800 includes an AND gate 810 and an inverter 820, where a first input port of the AND gate 810 is coupled to an input port of the inverter 820, and an output port of the inverter 820 is coupled to a second input port of the AND gate 810. In case the logic modifier 270 determines that a test pattern generated according to a reduced table with virtual defects is unable to detect a fault for one or more input conditions, the logic modifier 270 may add additional circuit models. For example, the logic modifier 270 may add a latch 880, and an AND gate 870 to the modified circuit design model 860. In one aspect, the latch 880 and the AND gate 870 can operate to adaptively change or control an input signal applied to the AND gate 810. For example, the output port of the inverter 820 is coupled to a first input port of the AND gate 870, an output port of the latch 880 is coupled to a second input port of the AND gate 870, and an output port of the AND gate 870 is coupled to the second input port of the AND gate 810. By adding the latch 880 and the AND gate 870, input conditions at the input ports of the AND gate 810 can be adaptively configured. In some cases, the latch 880 and the AND gate 870 may be replaced by other logic gates that can configure or change inputs applied to an integrated circuit to be tested. By adaptively configuring the input conditions at the input ports, varying input conditions can be applied to an integrated circuit with improved flexibility. For example, without the latch 880 and the AND gate 870, a set of input conditions [01] or [10] can be applied to the AND gate 870. By adding the latch 880 and the AND gate 870, a different or additional set of input conditions (e.g., [00] or [11]) can be applied to the AND gate 810. Accordingly, incorrect circuit operations due to one or more faults incapable of being detected by the circuit model 800 can be detected.

Figure 9:
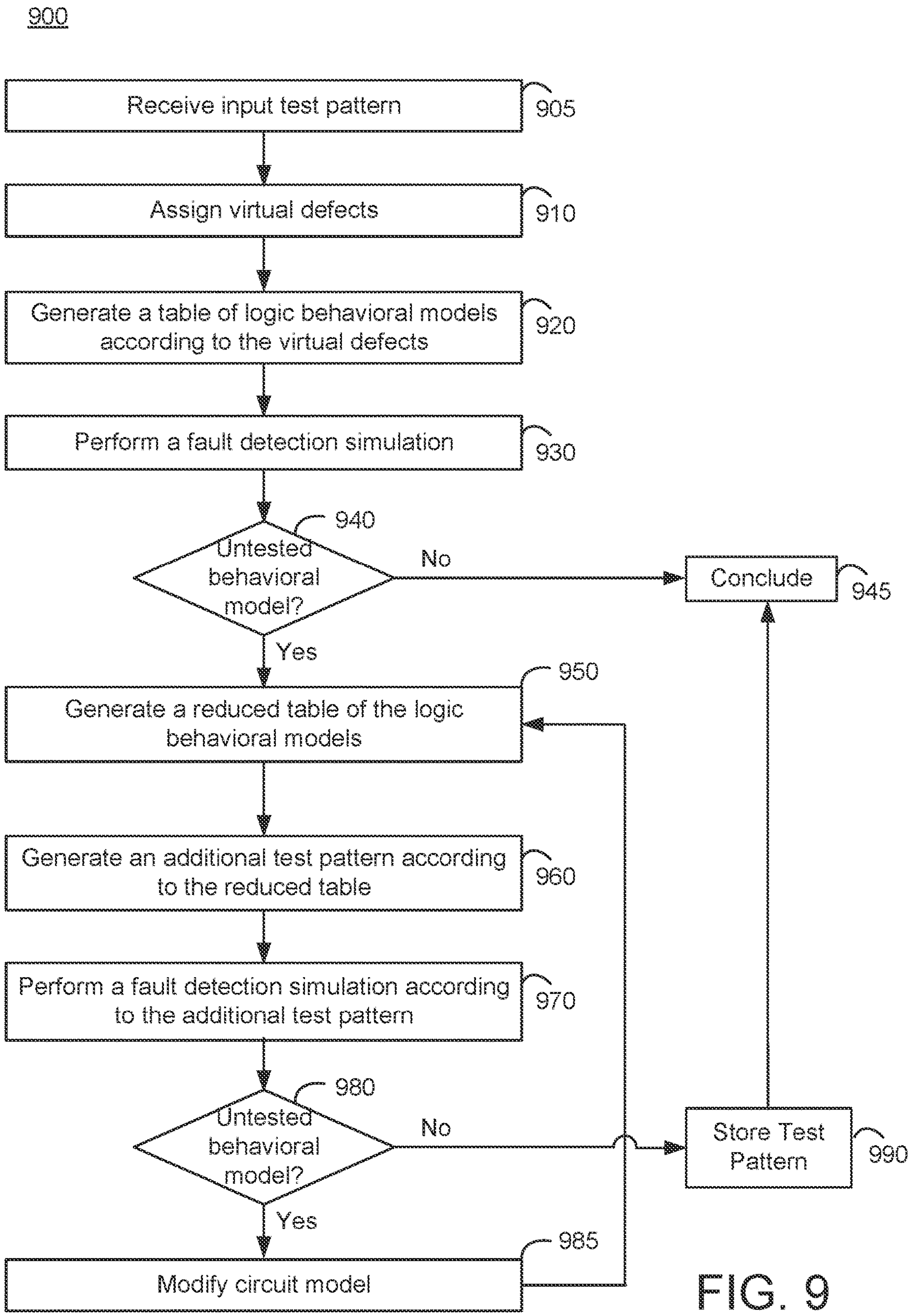
FIG. 9 is a flowchart of generating a test pattern according to virtual defects, in accordance with some embodiments.

FIG. 9 is a flowchart of a method 900 of generating a test pattern according to virtual defects, in accordance with some embodiments. The method 900 may be performed by the test pattern generator 110 of FIG. 1. In one aspect, the test pattern generator 110 determines whether one or more input test patterns (e.g., existing test patterns) can test various defects of a circuit model, and generates one or more additional test patterns for detecting defects that are not detectable by the one or more input test patterns. In some embodiments, the method 900 is performed by other entities. In some embodiments, the method 900 includes more, fewer, or different operations than shown in FIG. 9.

In an operation 905, the test pattern generator 110 receives an input test pattern for testing a circuit model. The input test pattern may be an existing test pattern generated based on physical characteristics of the circuit model and/or based on predicted logical characteristics of the circuit model.

In an operation 910, the test pattern generator 110 assigns virtual defects. A virtual defect may be an arbitrarily generated defect assigned to or corresponding to a unique set of input conditions irrespective of physical characteristics of an integrated circuit. In one aspect, each virtual defect functions as an identification of a corresponding set of input conditions. In one approach, the test pattern generator 110 determines possible sets of input conditions of a circuit model and assigns virtual defects to corresponding sets of input conditions. The test pattern generator 110 may generate behavioral models for corresponding sets of input conditions. For example, a behavioral model includes a corresponding set of input conditions, a corresponding output result, and a corresponding virtual defect. In one aspect, each virtual defect is generated irrespective of physical characteristics of an integrated circuit formed according to the circuit model. Each virtual defect may be associated with a single corresponding set of input conditions. In an operation 920, the test pattern generator 110 generates a table (e.g., 410, 510) of the logic behavioral models.

In an operation 930, the test pattern generator 110 performs a fault detection simulation. In one approach, the test pattern generator 110 simulates a circuit model according to the input test pattern and determines whether faults can be detected or not. For example, if the simulation output is different from a vector of expected output corresponding to the vector of different sets of input conditions, then the test pattern generator 110 may determine that a fault is detected. For example, if the simulation output matches the vector of expected output, then the test pattern generator 110 may determine that a fault is not detected.

In an operation 940, the test pattern generator 110 determines whether untested behavioral model in the table exists or not. In one approach, the test pattern generator 110 detects an instance of the plurality of instances of the circuit model simulated with a set of input conditions of a logic behavioral model from the table (e.g., 410, 510) and rendered a fault result different from the corresponding output result. In one approach, the table reducer 240 detects each of a plurality of instances simulated with a set of input conditions of a logic behavioral model from the table (e.g., 410, 510) and rendered a fault result different from the corresponding output result. The test pattern generator 110 may determine that one or more behavioral models with sets of input conditions that caused one or more instances that rendered the fault simulation result to be a tested behavioral model. The test pattern generator 110 may determine that one or more behavioral models with sets of input conditions unable to detect any fault as an untested behavioral model. In response to determining that no untested behavioral model exists, in an operation 945, the test pattern generator 110 may conclude the process 900. In one example, the test pattern generator 110 may determine that the input test pattern is sufficient to test various defects of the circuit model.

In response to determining that an untested behavioral model in the table exists, in an operation 950, the test pattern generator 110 generates a reduced table (e.g., 650, 750) of the logic behavioral models. In one approach, the test pattern generator 110 may exclude, from the plurality of logic behavioral models in the table, the tested logic behavioral models (or logic behavioral models applied to one or more instances and rendered fault results). In an operation 960, the test pattern generator 110 generates an additional test pattern according to the reduced table. In one approach, the test pattern generator 110 generates a vector or a sequence of a set of input conditions of a circuit model, according to different sets of input conditions in logic behavioral models of the circuit model in the reduced table (e.g., 650, 750).

In an operation 970, the test pattern generator 110 performs a fault detection simulation according to the additional test pattern. In one approach, the test pattern generator 110 simulates a circuit model according to the additional test pattern and determines whether faults can be detected or not. In an operation 980, the test pattern generator 110 may determine whether untested behavioral model in the reduced table (e.g., 650, 750) exists or not. In response to determining that no untested behavioral model exists, in an operation 990, the test pattern generator 110 may validate the additional test pattern and store the additional test pattern, for example, by the test pattern store 280. After storing the test pattern in the operation 990, the test pattern generator 110 may proceed to the operation 945 and generate a report on how many cells are still not fully tested and how many test patterns (e.g., existing test patterns and/or additional test patterns) are needed to test the rest.

In response to determining that an untested behavioral model in the reduced table exists, in an operation 985, the test pattern generator 110 may modify a circuit model. For example, the test pattern generator 110 may add a sequential logic circuit model (e.g., 880) and an AND gate model (e.g., 870) at an input port of the circuit model and return to the operation 950. By adding a sequential logic circuit, varying input conditions can be applied to an integrated circuit with improved flexibility.

Advantageously, generating a test pattern according to virtual defects disclosed herein allows detecting incorrect computations by a circuit component despite of unmodeled defects. In one aspect, the test pattern generator 110 determines whether one or more input test patterns (e.g., existing test patterns) can test various defects of a circuit model, and generates one or more additional test patterns for detecting defects that are not detectable by the one or more input test patterns. In some embodiments, possible sets of input conditions of a circuit component are determined, and each set of input conditions is assigned to a unique virtual defect irrespective of any physical defect of the circuit component. Moreover, a test pattern can be generated based on different sets of input conditions with virtual defects. A test pattern based on different sets of inputs conditions with virtual defects may allow detecting incorrect circuit operations due to unmodeled defects.

Advantageously, the virtual defects allow a test pattern to be generated in an efficient manner. By assigning, to each of a corresponding set of input conditions, a unique virtual defect irrespective of physical characteristics of a circuit model, and generating a test pattern according to different sets of input conditions and corresponding virtual defects, cost inefficient simulations (e.g., SPICE simulation) to predict effects of physical defects can be obviated. Hence, the test pattern can be generated in a computationally efficient manner by omitting such cost inefficient simulations.

Advantageously, an additional test pattern allowing detection of unmodeled defects that cannot be detected according to one or more existing test patterns can be generated in an efficient manner. For example, one or more existing test patterns are generated to detect one or more physical defects of a circuit model, but the existing test patterns may not be able to detect unmodeled defects. According to the existing test patterns, a fault detection simulation of the circuit model can be performed. Moreover, one or more sets of input conditions or logic behavioral models incapable of detecting a defect of the circuit model through the fault detection simulation according to the existing test patterns can be determined. Furthermore, an additional test pattern capable of detecting the defect of the circuit model can be generated based on the determined one or more sets of input conditions or logic behavioral models, which are incapable of detecting a defect of the circuit model through the fault detection simulation according to the existing test patterns.

Figure 10:
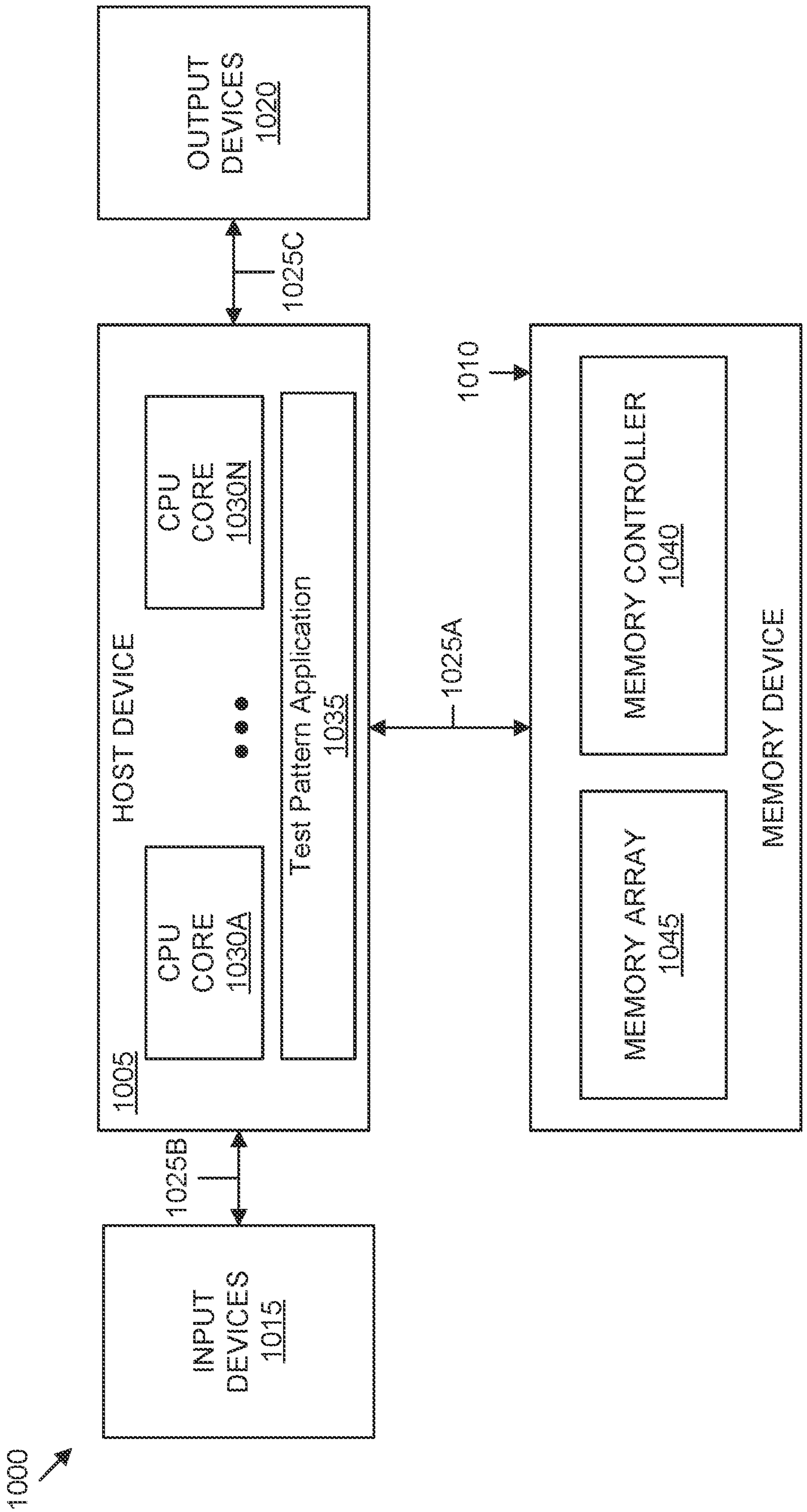
FIG. 10 is an example block diagram of a computing system, in accordance with some embodiments.

Referring now to FIG. 10, an example block diagram of a computing system 1000 is shown, in accordance with some embodiments of the disclosure. The computing system 1000 may be used by a circuit or layout designer for integrated circuit design. A "circuit" as used herein is an interconnection of electrical components such as resistors, transistors, switches, batteries, inductors, or other types of semiconductor devices configured for implementing a desired functionality. The computing system 1000 includes a host device 1005 associated with a memory device 1010. In some embodiments, the host device 1005 is embodied as the test pattern generator 110 of FIG. 1. The host device 1005 may be configured to receive input from one or more input devices 1015 and provide output to one or more output devices 1020. The host device 1005 may be configured to communicate with the memory device 1010, the input devices 1015, and the output devices 1020 via appropriate interfaces 1025A, 1025B, and 1025C, respectively. The computing system 1000 may be implemented in a variety of computing devices such as computers (e.g., desktop, laptop, servers, data centers, etc.), tablets, personal digital assistants, mobile devices, other handheld or portable devices, or any other computing unit suitable for performing schematic design and/or layout design using the host device 1005.

The input devices 1015 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 1005 and that allows an external source, such as a user (e.g., a circuit or layout designer), to enter information (e.g., data) into the host device and send instructions to the host device. Similarly, the output devices 1020 may include a variety of output technologies such as external memories, printers, speakers, displays, microphones, light emitting diodes, headphones, video devices, and any other output peripherals that are configured to receive information (e.g., data) from the host device 1005. The "data" that is either input into the host device 1005 and/or output from the host device may include any of a variety of textual data, circuit data, signal data, semiconductor device data, graphical data, combinations thereof, or other types of analog and/or digital data that is suitable for processing using the computing system 1000.

The host device 1005 includes or is associated with one or more processing units/processors, such as Central Processing Unit ("CPU") cores 1030A-1030N. The CPU cores 1030A-1030N may be implemented as an Application Specific Integrated Circuit ("ASIC"), Field Programmable Gate Array ("FPGA"), or any other type of processing unit. Each of the CPU cores 1030A-1030N may be configured to execute instructions for running one or more applications of the host device 1005. In some embodiments, the instructions and data to run the one or more applications may be stored within the memory device 1010. The host device 1005 may also be configured to store the results of running the one or more applications within the memory device 1010. Thus, the host device 1005 may be configured to request the memory device 1010 to perform a variety of operations. For example, the host device 1005 may request the memory device 1010 to read data, write data, update or delete data, and/or perform management or other operations. One such application that the host device 1005 may be configured to run may be a test pattern application 1035. The test pattern application 1035 may be part of a computer aided design or electronic design automation software suite that may be used by a user of the host device 1005 to generate a test pattern for testing an integrated circuit. In some embodiments, the instructions to execute or run the test pattern application 1035 may be stored within the memory device 1010. The test pattern application 1035 may be executed by one or more of the CPU cores 1030A-1030N using the instructions associated with generating a test pattern from the memory device 1010.

Referring still to FIG. 10, the memory device 1010 includes a memory controller 1040 that is configured to read data from or write data to a memory array 1045. The memory array 1045 may include a variety of volatile and/or non-volatile memories (or non-transitory computer readable medium). For example, in some embodiments, the memory array 1045 may include NAND flash memory cores. In other embodiments, the memory array 1045 may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the memory array. The memories within the memory array 1045 may be individually and independently controlled by the memory controller 1040. In other words, the memory controller 1040 may be configured to communicate with each memory within the memory array 1045 individually and independently. By communicating with the memory array 1045, the memory controller 1040 may be configured to read data from or write data to the memory array in response to instructions received from the host device 1005. Although shown as being part of the memory device 1010, in some embodiments, the memory controller 1040 may be part of the host device 1005 or part of another component of the computing system 1000 and associated with the memory device. The memory controller 1040 may be implemented as a logic circuit in either software, hardware, firmware, or combination thereof to perform the functions described herein. For example, in some embodiments, the memory controller 1040 may be configured to retrieve the instructions associated with the test pattern application 1035 stored in the memory array 1045 of the memory device 1010 upon receiving a request from the host device 1005.

It is to be understood that only some components of the computing system 1000 are shown and described in FIG. 10. However, the computing system 1000 may include other components such as various batteries and power sources, networking interfaces, routers, switches, external memory systems, controllers, etc. Generally speaking, the computing system 1000 may include any of a variety of hardware, software, and/or firmware components that are needed or considered desirable in performing the functions described herein. Similarly, the host device 1005, the input devices 1015, the output devices 1020, and the memory device 1010 including the memory controller 1040 and the memory array 1045 may include other hardware, software, and/or firmware components that are considered necessary or desirable in performing the functions described herein.

One aspect of this description relates to an integrated circuit. In some embodiments, to each of a plurality of sets of input conditions of a circuit model, a corresponding virtual defect is assigned. In some embodiments, a table of the circuit model including a plurality of logic behavioral models of the circuit model is generated. Each of the plurality of logic behavioral models may include a corresponding set of the plurality of sets of input conditions, a corresponding output result, and the corresponding virtual defect. In some embodiments, a test pattern for the circuit model is generated, based at least in part on the table of the circuit model.

One aspect of this description relates to a device for testing an integrated circuit. In some embodiments, the device includes one or more processors, and a non-transitory computer readable medium. The non-transitory computer readable medium may store instructions when executed by the one or more processors cause the one or more processors to generate a table of a circuit model including a plurality of logic behavioral models of the circuit model. Each of the plurality of logic behavioral models may include a corresponding set of input conditions, a corresponding output result, and a corresponding virtual defect. The non-transitory computer readable medium may store instructions when executed by the one or more processors cause the one or more processors to perform a fault detection simulation of the circuit model, according to one or more test patterns associated with the circuit model. The non-transitory computer readable medium may store instructions when executed by the one or more processors cause the one or more processors to generate a reduced table of the circuit model according to the fault detection simulation. The non-transitory computer readable medium may store instructions when executed by the one or more processors cause the one or more processors to generate an additional test pattern according to the reduced table of the circuit model.

One aspect of this description relates to a non-transitory computer readable medium storing for testing an integrated circuit. The non-transitory computer readable medium may store instructions when executed by one or more processors cause the one or more processors to generate a table of a circuit model, the table including a plurality of logic behavioral models of the circuit model. Each of the plurality of logic behavioral models may include a corresponding set of input conditions, a corresponding output result, and a corresponding virtual defect. The non-transitory computer readable medium may store instructions when executed by one or more processors cause the one or more processors to simulate a plurality of instances of the circuit model according to one or more test patterns associated with the circuit model. The non-transitory computer readable medium may store instructions when executed by one or more processors cause the one or more processors to detect a first instance of the plurality of instances of the circuit model. The first instance may be simulated with a set of input conditions of a logic behavioral model from the table and rendered a fault result different from its corresponding output result. The non-transitory computer readable medium may store instructions when executed by one or more processors cause the one or more processors to exclude the detected logic behavioral model from the table of the circuit model.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

assigning, to each of a plurality of sets of input conditions of a circuit model, a corresponding virtual defect, wherein each virtual defect is an arbitrarily assigned identifier uniquely associated with one such set of input conditions and is assigned independent of, and without reference to, any modeled fault effect or any known or assumed physical characteristic, limitation, or defect of an integrated circuit physically formed according to the circuit model;

generating a table of the circuit model, the table including a plurality of logic behavioral models of the circuit model, each of the plurality of logic behavioral models including a corresponding set of the plurality of sets of input conditions, a corresponding output result, and the corresponding virtual defect;

executing, according to the table, a fault detection simulation by simulating a plurality of instances of the circuit model comprising logic gates, wherein simulating the plurality of instances of the circuit model comprises applying a plurality of existing test patterns, each associated with the corresponding virtual defect, to the circuit model to simulate behavior of the logic gates, and generating a plurality of simulation outputs in response to applying the plurality of existing test patterns;

comparing each of the plurality of simulation outputs to a vector from the plurality of logic behavioral models in the table;

detecting, in response to a match between at least one simulation output and the vector, at least one instance of the plurality of instances that is absent of a fault;

determining, in response to executing the detection, that at least one of the plurality of logic behavioral models is untested based on the detected at least one instance of the plurality of instances corresponding to the at least one of the plurality of logic behavioral models absent of the fault;

in response to determining that the at least one of the plurality of logic behavioral models is untested, modifying the circuit model by adding one or more logic components at input ports of the circuit model to adaptively configure input conditions, according to input conditions unable to detect fault associated with the at least one of the plurality of logic behavioral models that is untested;

generating, according to the modification, a modified circuit model for physical implementation of the integrated circuit;

generating a test pattern for the modified circuit model, based at least in part on the table of the circuit model, according to the corresponding virtual defects of the at least one of the plurality of logic behavioral models that is untested, wherein each virtual defect functions as an identification of the corresponding set of input conditions, wherein the test pattern is different from the plurality of existing test patterns and enables detection of unmodeled defects; and executing, using the test pattern, a test on the integrated circuit formed based on the modified circuit model having the one or more added logic components, wherein executing the test comprises:

generating input conditions according to the test pattern;

applying the input conditions to electrical input pins of the fabricated physical integrated circuit formed from the modified circuit model, via an automated test system comprising signal generation hardware and measurement instrumentation;

receiving measured output electrical signals from the fabricated physical integrated circuit; and determining whether the fabricated physical integrated circuit is operating as designed based on the measured output electrical signals.

2. The method of claim 1, wherein the test pattern includes a vector of two or more different sets of the plurality of sets of input conditions.

3. The method of claim 1, further comprising:

executing the fault detection simulation of the circuit model according to one or more different test patterns associated with the circuit model; and generating a reduced table of the circuit model according to the fault detection simulation, wherein the test pattern is generated based on the reduced table of the circuit model.

4. The method of claim 3, wherein executing the fault detection simulation of the circuit model includes:

simulating the plurality of instances of the circuit model according to the one or more different test patterns associated with the circuit model, and detecting one instance of the plurality of instances of the circuit model, the one instance simulated with a set of input conditions of a logic behavioral model from the table and rendered a fault result different from the corresponding output result.

5. The method of claim 4, wherein generating the reduced table of the circuit model according to the fault detection simulation includes:

excluding, from the plurality of logic behavioral models in the table, the logic behavioral model applied to the one instance and rendered the fault result.

6. The method of claim 3, wherein executing the fault detection simulation of the circuit model includes:

simulating the plurality of instances of the circuit model according to the one or more different test patterns associated with the circuit model, and detecting the plurality of instances of the circuit model, each of the plurality of instances simulated with a set of input conditions of a logic behavioral model from the table and rendered a fault result different from the corresponding output result, wherein the logic behavioral model is determined to be one of one or more of the plurality of logic behavioral models.

7. The method of claim 6, wherein generating the reduced table of the circuit model according to the fault detection simulation includes:

excluding, from the plurality of logic behavioral models in the table, the logic behavioral model applied to the plurality of instances of the circuit model and rendered the fault result.

8. The method of claim 3, further comprising:

simulating the plurality of instances of the circuit model according to the test pattern;

detecting one instance of the plurality of instances of the circuit model, the one instance simulated with a set of input conditions of a logic behavioral model in the reduced table and rendered a result matching the corresponding output result; and adding a test logic to each of the plurality of instances.

9. A device comprising:

one or more processors; and a non-transitory computer readable medium storing instructions when executed by the one or more processors cause the one or more processors to:

generate a table of a circuit model, the table including a plurality of logic behavioral models of the circuit model, each of the plurality of logic behavioral models including a corresponding set of input conditions, a corresponding output result, and a corresponding virtual defect, wherein each virtual defect is an arbitrarily assigned identifier uniquely associated with one such set of input conditions and is assigned independent of, and without reference to, any modeled fault effect or any known or assumed physical characteristic, limitation, or defect of an integrated circuit physically formed according to the circuit model, perform, according to one or more test patterns associated with the circuit model, a fault detection simulation by simulating a plurality of instances of the circuit model comprising logic gates, wherein simulating the plurality of instances of the circuit model comprises applying a plurality of existing test patterns, each associated with the corresponding virtual defect, to the circuit model to simulate behavior of the logic gates, and generating a plurality of simulation outputs in response to applying the plurality of existing test patterns, compare each of the plurality of simulation outputs to a vector from the plurality of logic behavioral models in the table, detect, in response to a match between at least one simulation output and the vector, at least one instance of the plurality of instances that is absent of a fault, determine, in response to performing the detection, that at least one of the plurality of logic behavioral models associated with at least one of the one or more test patterns is untested based on the detected at least one instance of the plurality of instances corresponding to the at least one of the plurality of logic behavioral models absent of the fault, generate a reduced table of the circuit model according to the detection, including the at least one of the plurality of logic behavioral models that is untested based on the at least one instance of the plurality of instances absent of the fault, modify, according to the reduced table, the circuit model by adding one or more logic components at input ports of the circuit model to adaptively configure input conditions, according to input conditions unable to detect fault associated with the at least one of the plurality of logic behavioral models that is untested, generate, according to the modification, a modified circuit model for physical implementation of the integrated circuit, generate an additional test pattern according to the modified circuit model and according to the corresponding virtual defects of the at least one of the plurality of logic behavioral models that is untested, wherein each virtual defect functions as an identification of the corresponding set of input conditions, wherein the additional test pattern is different from the plurality of existing test patterns and enables detection of unmodeled defects, and execute, using the additional test pattern, a test on the integrated circuit formed based on the modified circuit model having the one or more added logic components, wherein to execute the test, the instructions cause the one or more processors to:

generate input conditions according to the additional test pattern;

apply the input conditions to electrical input pins of the fabricated physical integrated circuit formed from the modified circuit model, via an automated test system comprising signal generation hardware and measurement instrumentation;

receive measured output electrical signals from the fabricated physical integrated circuit; and determine whether the fabricated physical integrated circuit is operating as designed based on the measured output electrical signals.

10. The device of claim 9, wherein the additional test pattern includes a vector of two or more different sets of a plurality of sets of input conditions.

11. The device of claim 9, wherein the instructions when executed by the one or more processors that cause the one or more processors to perform the fault detection simulation of the circuit model further cause the one or more processors to:

simulate the plurality of instances of the circuit model according to the one or more test patterns associated with the circuit model, and detect one instance of the plurality of instances of the circuit model, the one instance simulated with a set of input conditions of a logic behavioral model from the table and rendered a fault result different from the corresponding output result.

12. The device of claim 11, wherein the instructions when executed by the one or more processors that cause the one or more processors to generate the reduced table of the circuit model according to the fault detection simulation further cause the one or more processors to:

exclude, from the plurality of logic behavioral models in the table, the logic behavioral model applied to the one instance and rendered the fault result.

13. The device of claim 11, wherein the instructions when executed by the one or more processors that cause the one or more processors to perform the fault detection simulation of the circuit model further cause the one or more processors to:

simulate the plurality of instances of the circuit model according to the one or more test patterns associated with the circuit model, and detect the plurality of instances of the circuit model, each of the plurality of instances simulated with the set of input conditions of the logic behavioral model from the table and rendered the fault result different from the corresponding output result, wherein the logic behavioral model is determined to be one of the one or more of the plurality of logic behavioral models.

14. The device of claim 13, wherein the instructions when executed by the one or more processors that cause the one or more processors to generate the reduced table of the circuit model according to the fault detection simulation further cause the one or more processors to:

exclude, from the plurality of logic behavioral models in the table, the logic behavioral model applied to the plurality of instances of the circuit model and rendered the fault result.

15. A non-transitory computer readable medium storing instructions when executed by one or more processors cause the one or more processors to:

generate a table of a circuit model, the table including a plurality of logic behavioral models of the circuit model, each of the plurality of logic behavioral models including a corresponding set of input conditions, a corresponding output result, and a corresponding virtual defect, wherein each virtual defect is an arbitrarily assigned identifier uniquely associated with one such set of input conditions and is assigned independent of, and without reference to, any modeled fault effect or any known or assumed physical characteristic, limitation, or defect of an integrated circuit physically formed according to the circuit model;

simulate, according to one or more existing test patterns associated with the circuit model, a plurality of instances of the circuit model comprising logic gates, by applying the one or more existing test patterns, each associated with the corresponding virtual defect, to the circuit model to simulate behavior of the logic gates, and generating a plurality of simulation outputs in response to applying the one or more existing test patterns;

compare each of the plurality of simulation outputs to a vector from the plurality of logic behavioral models in the table;

detect one instance of the plurality of instances of the circuit model, the one instance simulated with a set of input conditions of a logic behavioral model from the table and rendered a fault result different from its corresponding output result;

determine, in response to a match between at least one simulation output and the vector, that at least one other instance of the plurality of instances of the circuit model is untested based on the at least one other instance of the plurality of instances corresponding to another logic behavioral model absent of a fault;

exclude the logic behavioral model from the table of the circuit model according to the detected one instance;

in response to determining that the at least one other instance of the plurality of instances is untested, modify the circuit model by adding one or more logic components at input ports of the circuit model to adaptively configure input conditions, according to input conditions unable to detect fault associated with the another logic behavioral model absent of the fault;

generate, according to the modification, a modified circuit model for physical implementation of the integrated circuit;

generate an additional test pattern for the modified circuit model according to the corresponding virtual defects of remaining behavioral models in the table after the exclusion, wherein each virtual defect functions as an identification of the corresponding set of input conditions, the remaining behavioral models associated with the at least one other instance of the plurality of instances of the circuit model that is untested based on the at least one other instance of the plurality of instances absent of the fault, wherein the additional test pattern is different from the one or more existing test patterns and enables detection of unmodeled defects; and execute, using the additional test pattern, a test on the integrated circuit formed based on the modified circuit model having the one or more added logic components, wherein to execute the test, the instructions cause the one or more processors to:

generate input conditions according to the additional test pattern;

apply the input conditions to electrical input pins of the fabricated physical integrated circuit formed from the modified circuit model, via an automated test system comprising signal generation hardware and measurement instrumentation, and receive measured output electrical signals from the fabricated physical integrated circuit; and determine whether the fabricated physical integrated circuit is operating as designed based on the measured output electrical signals.

16. The non-transitory computer readable medium of claim 15, wherein the one or more existing test patterns includes a vector of two or more different sets of a plurality of sets of input conditions.

17. The non-transitory computer readable medium of claim 15, wherein the one or more processors are further configured to:

generate a reduced table of the circuit model according to the simulation of the plurality of instances, wherein the additional test pattern is generated based on the reduced table of the circuit model.

18. The non-transitory computer readable medium of claim 15, wherein the one or more processors are further configured to:

exclude, from the plurality of logic behavioral models in the table, the logic behavioral model applied to the plurality of instances of the circuit model and rendered the fault result.

19. The method of claim 1, wherein the fabricated physical integrated circuit comprises the physical characteristics that the virtual defects are generated irrespective of.

20. The device of claim 9, wherein the fabricated physical integrated circuit comprises the physical characteristics that the virtual defects are generated irrespective of.

* * * * *